June 11, 1963  L. C. KEMP, JR  3,093,457
RECOVERY OF ELEMENTAL SULFUR FROM ITS ORES
Filed Dec. 30, 1954
Fig. 1.
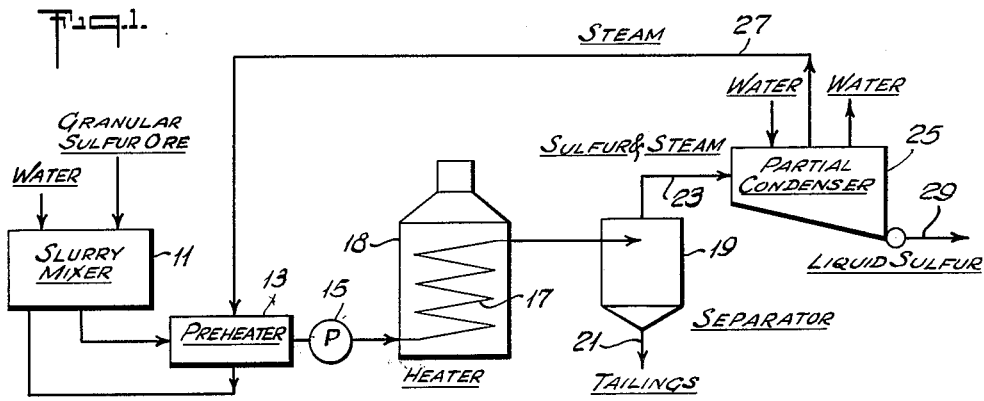
Fig. 2.
Fig. 3.
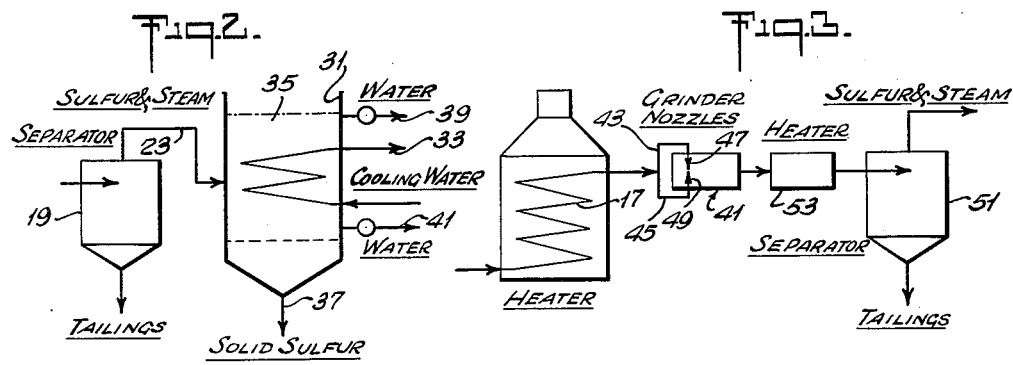
Fig. 4.
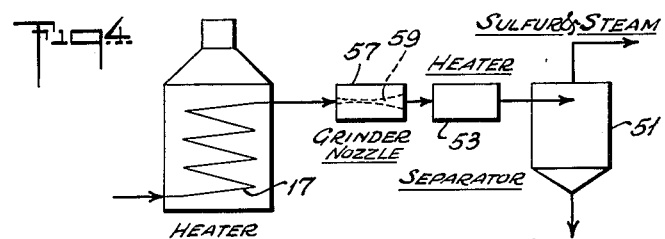
Fig. 5.
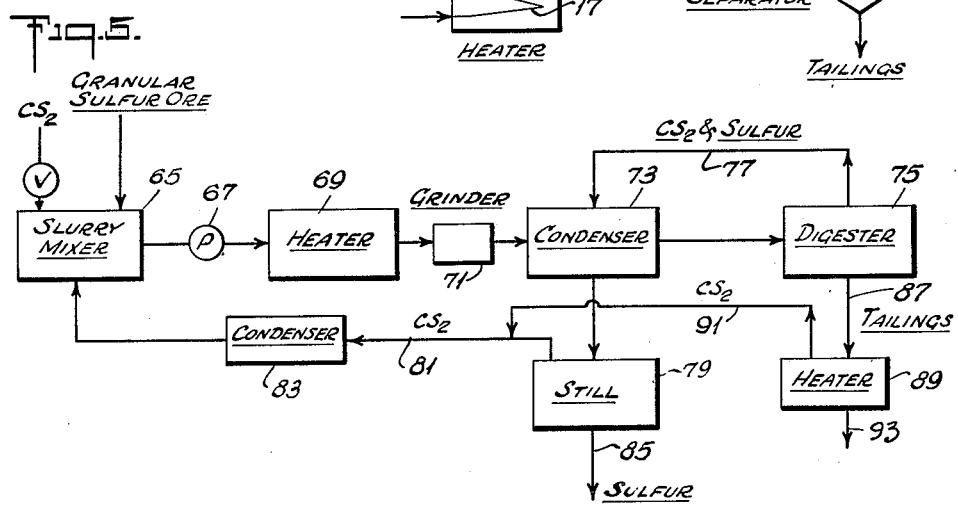

United States Patent Office 3,093,457
Patented June 11, 1963

3,093,457
RECOVERY OF ELEMENTAL SULFUR FROM ITS ORES
Lebbeus C. Kemp, Jr., Scarsdale, N.Y., assignor to Texaco Inc., a corporation of Delaware
Filed Dec. 30, 1954, Ser. No. 478,565
10 Claims. (Cl. 23—309)

The present invention relates to a novel process for recovering elemental sulfur from its ores.

It is well known that elemental sulfur occurs in argillaceous limestone associated with gypsum and marl, as well as in volcanic rock. In some localities, such sulfur exists far below the surface of the earth in relatively massive bodies which can be recovered by the well known Frasch process, wherein hot water is sent down into the earth to melt the sulfur which is then forced up to the surface. In other localities sulfur ore is located near the surface of the earth and can be mined from open pits. Separation of sulfur from the ore in the latter type of deposits has usually been accomplished by heating the ore to melt out the sulfur, as by burning fuel in contact with the ore. Oxides of sulfur released to the atmosphere in this operation are a great nuisance to both animals and vegetation.

My invention is a novel process for economically and rapidly recovering sulfur from minable ores wherein it may be distributed primarily as irregular incrustations, small pockets, thin bands, specks, and veinlets. At the same time, release of sulfur oxides to the atmosphere is avoided.

First, the ore is mined and crushed to a moderately small size such as about ⅛ to ¼ inch in average diameter. Then the ore particles are mixed with a vaporizable liquid such as water or a sulfur solvent to form a flowable mixture such as a pumpable slurry. This mixture is passed into a confined heating zone formed within a long length of pipe, wherein it is heated sufficiently to vaporize the liquid and form a flowing dispersion of the granular particles in vapor. Then the particles of ore are disintegrated to an extremely fine powdery form by passing the dispersion through a succeeding zone of high velocity flow and subjecting the flowing stream therein to turbulence and a velocity preferably in excess of 25 ft. per second.

When using a liquid which is a non-solvent for sulfur the temperature should be sufficiently high to cause the sulfur to vaporize—usually substantially above 100° C. Sulfur vaporization is not essential when operating with a sulfur solvent.

The sulfur, whether or not vaporized, flows with the vaporized liquid and finely ground ore particles to suitable separating apparatus wherein the sulfur and associated liquid or vapor are separated from the ore tailings and delivered to suitable apparatus for recovering the sulfur.

The fine ore tailings are discharged from the separator and may be discarded, or used industrially if they have suitable characteristics. For example, gypsum and limestone can be made into plaster or cement, and limestone can be used agriculturally.

The principles of the invention will be described more in detail with reference to the drawings, wherein:

FIG. 1 is a schematic flow diagram showing apparatus for performing an embodiment of the invention wherein a liquid non-solvent for sulfur is mixed with the ore;

FIG. 2 is a schematic flow diagram showing a part only of apparatus similar to FIG. 1, wherein, a modified arrangement is employed for recovering sulfur;

FIG. 3 is a schematic flow diagram showing a part only of apparatus similar to FIG. 1, but employing an opposed nozzle grinder for disintegrating the ore;

FIG. 4 is a schematic flow diagram similar to FIG. 3, but employing a convergent-divergent nozzle for disintegration; and FIG. 5 is a schematic flow diagram showing apparatus for performing still another embodiment of the invention wherein a liquid sulfur solvent is mixed with the ore.

Referring to FIG. 1, crushed particles of sulfur ore are fed to a mixer 11 within which they are mixed with water or other suitable liquid which is a non-solvent for sulfur to form a flowable mixture. For simplicity water will be used hereinafter to exemplify the invention, but it is to be understood that other liquids may be used if desired. Normally a pumpable slurry is desired in which the water constitutes from 35 to 67% of the mixture by volume, generally about 50%.

From mixer 11 the mixture is first passed through a preheater 13 wherein its temperature is raised by heat exchange with hot effluent. A pump 15 then passes the slurry under high pressure into a long heater tube 17 in a furnace 18. Tube 17 may have the form of a coil, or series of parallel tubes connected together by return bends, or even a long straight tube. Furnace 18 may be heated in any desired way, as by coal, oil, or gas.

In heater tube 17 the temperature of the mixture is raised sufficiently to vaporize substantially all of its water content, thereby forming a dispersion of ore particles in vapor. This dispersion flows from the initial heating zone through a succeeding zone of high velocity flow wherein extreme turbulence and a high velocity in excess of 25 ft. per second, and even as high as hundreds or thousands of feet per second, are developed.

While sulfur is sensibly volatile at 100° C. or higher and thus sublimes to form a vapor below its boiling point, it is usually advantageous to heat the dispersion in tube 17 to a temperature above the boiling point of sulfur, about 445° C. Higher temperatures can be used satisfactorily, depending mainly on the heat resistance of the apparatus.

As a result of the high velocity and turbulence in tube 17, the ore is disintegrated to a fine powder which may be as fine as 1 to 10 microns average particle size. Such fragmentation makes available practically all of the sulfur occluded within the ore particles so that it can vaporize and flow as a vapor with the steam.

The hot dispersion is discharged from heater tube 17 into a separator 19 such as a centrifugally operated cyclone separator. The tailings fall to the bottom of the separator and are discharged through an outlet 21.

The hot steam and sulfur vapor pass off the top through a conduit 23 and enter a water cooled partial condenser 25 wherein the temperature is lowered sufficiently to condense most of the sulfur to liquid form while retaining the steam in its vaporous condition, say to a temperature between 150° and 260° C. Steam, together with a relatively small carry-over of sulfur, passes off the top through a conduit 27, flows to the preheater 13 for condensing the steam to water and preheating the incoming slurry, and then passes as a liquid into mixer 11 to assist in making up the initial slurry. Liquid sulfur is removed from partial condenser 25 through a bottom outlet 29 and allowed to solidify.

In the normal operation the slurry is pumped into the heater tube 17 at a pressure of about 200 pounds per square inch or more while atmospheric pressure is employed at the outlet of the heater tube. It is evident that suitable operation can also be had with higher or lower inlet pressures, and either super-atmospheric or sub-atmospheric pressure at the outlet. A pressure drop of at least about 200 pounds per square inch is advantageous for inducing the necessary turbulence and velocity.

In the modification shown in FIG. 2 the apparatus is identical to FIG. 1 through the cyclone 19, but recovery of the sulfur is accomplished by passing the mixed vapors through conduit 23 into a full condenser 31 supplied with cooling water through a coil 33 in sufficient volume to cool the effluent below 100° C., thus condensing completely both the sulfur and the steam and forming a body of liquid 35 in the condenser. Sulfur has a specific gravity of about 1.9 to 2.1 and thus sinks in the water to collect on the bottom of the condenser where it is removed as a solid through outlet 37. Water can be removed from the condenser through either or both of outlets 39 and 41 for return to the slurry formation step.

Referring to FIG. 3, heater tube 17 is connected to a grinder 41 by means of a pair of ducts 43 and 45 leading to a pair of opposed injector nozzles 47 and 49 which discharge opposed jets of dispersion against one another at high velocity tot disintegrate the solid particles. An impingement angle of 180° is advantageous, although lesser angles can be used. The effluent from grinder 41 then passes to a centrifugal separator 51 in which the sulfur and steam are separated from the tailings as described in connection with FIG. 1.

To assure vaporization of the sulfur from the disintegrated ore particles downstream of grinder 41 it is advantageous to employ a heater 53 in the line between the grinder and separator 51 to supply additional heat. This may be fired in any suitable way, as by gas, oil or coal.

The modification shown in FIG. 4 is similar to that of FIG. 3, except that in place of the opposed jet grinder 41 there is employed a different type of grinder 57 within which is located a convergent-divergent passageway 59 which increases the velocity of the dispersion to such a great value, such as supersonic velocities of several thousand feet per second, that the ore particles are thoroughly disintegrated.

The modifications of FIGS. 3 and 4 are advantageous for preventing erosion of the tube 17 because a relatively low velocity is maintained in the tube, such as 100 feet per second or less, while the high velocity and turbulence are developed locally in grinders 41 and 57.

Referring to FIG. 5 there is shown an arrangement of apparatus for recovering sulfur by solvent action. The crushed ore particles are mixed in a mixer 65 with a liquid which is a solvent for sulfur, such as carbon disulfide (B.P. 46.3° C.), ethyl alcohol (B.P. 78.4° C.), ether (B.P. 34.6° C.), or such light petroleum solvents as kerosene (B. range 175–275° C.) and naphtha (top of boiling range, 175–220° C.). Carbon disulfide will be described as the solvent solely for illustrating the invention, but with the other solvents it is only necessary to adjust operating conditions in accordance with the boiling points of the solvents at the operating pressures.

The mixture or slurry of ore in carbon disulfide, which may be 35–67% liquid by volume, desirably about 50%, is passed by a pump 67 into a long tube in a heater 69 as described in connection with FIGS. 1–4. In heater 69 the solvent is vaporized and a dispersion is formed which may flow as described in connection with FIG. 1 for disintegrating the ore particles. Alternatively, the dispersion flows to a grinder 71 as described in connection with FIGS. 3 and 4 for disintegration.

The dispersion of finely powdered ore then passes to a condenser 73 which may be cooled by water as well as by the effluent stream from the process, to condense the vapors and reform a slurry.

From condenser 73 the slurry passes to a digester 75 which may employ a suitable mixing device for assuring thorough contact of the solvent with the ore particles and sulfur. The major portion of the sulfur dissolves in the solvent in digester 75 and the resulting solution is removed through a conduit 77 leading to condenser 73 to assist in condensing the dispersion.

From condenser 73 the solution passes into a separator 79 such as a heated still wherein the carbon disulfide is evaporated off. Vapors flow by way of a conduit 81 to a condenser 83, and the condensed liquid returns to the mixer 65. Sulfur is removed from separator 79 in either the liquid or solid form by way of a discharge conduit 85.

The ore tailings leave digester 75 through an outlet 87, carrying with them a small amount of occluded solvent. This is vaporized in a heater 89 and flows through a conduit 91 to conduit 81 for return to mixer 65. The stripped tailings then leave heater 89 through outlet 93.

Obviously, many modifications and variations of the invention, as hereinbefore set forth, may be made without departing from the spirit and scope thereof, and therefore only such limitations should be imposed as are indicated in the appended claims.

I claim:

1. A process for recovering elemental sulfur from ore containing same which comprises forming a flowable mixture of granular particles of said ore in a vaporizable liquid which is a non-solvent for sulfur; passing said mixture as a flowing stream into and through a confined heating zone; heating said mixture in said zone to a temperature sufficiently above the boiling temperatures of said liquid and of sulfur to vaporize said liquid and said sulfur, forming therein a flowing dispersion of said particles in vapor; disintegrating said granular particles of ore and liberating sulfur therefrom by passing said dispersion as a flowing stream through a succeeding zone of high velocity flow and subjecting the flowing stream therein to turbulence and a high velocity in excess of 25 feet per second; separating the sulfur vapor and the vapor of said vaporizable liquid from the disintegrated ore particles; and condensing and recovering the separated sulfur.

2. A process in accordance with claim 1 wherein said vaporizable liquid is water and the vapor thereof is steam.

3. A process in accordance with claim 2 wherein condensing and recovery of sulfur are accomplished by lowering the temperature of said mixture of steam and sulfur vapor to a temperature below the vaporization temperature of sulfur but above that of water whereby the sulfur is condensed while the steam is retained in a vaporous condition; and withdrawing the steam from the condensed sulfur.

4. A process in accordance with claim 3, also comprising condensing said steam to water after separation thereof from said sulfur and feeding said water into said flowable mixture.

5. A process in accordance with claim 4, wherein said steam is condensed by passing it in heat exchange relationship with said flowable mixture upstream of said heating zone.

6. A process in accordance with claim 2 wherein condensing and recovery of sulfur are accomplished by concurrently cooling and fully condensing both the steam and vapors of sulfur together, and separating the resulting water and sulfur from one another.

7. A process in accordance with claim 1, including passing said dispersion through at least part of said succeeding zone as a plurality of opposed mutually impinging streams.

8. A process in accordance with claim 7, also comprising heating said dispersion between the locality of said impinging streams and the locality of separating sulfur from ore.

9. A process in accordance with claim 1, including passing said dispersion through a convergent-divergent nozzle to reduce the pressure and increase the velocity thereof.

10. A process in accordance with claim 9, also comprising heating said dispersion between the locality of said nozzle and the locality of separating sulfur from ore.

References Cited in the file of this patent

UNITED STATES PATENTS

| | | |
|---|---|---|
| 1,729,246 | Crawley | Sept. 24, 1929 |
| 1,731,563 | Crawley | Oct. 15, 1929 |
| 1,763,762 | Crawley | June 17, 1930 |
| 1,963,921 | Nagelvoort | June 19, 1934 |
| 2,494,153 | Andrews et al. | Jan. 10, 1950 |
| 2,537,842 | McGauley et al. | Jan. 9, 1951 |
| 2,560,807 | Lobo | July 17, 1951 |
| 2,735,787 | Eastman et al. | Feb. 21, 1956 |